(12) United States Patent
Srowig et al.

(10) Patent No.: US 12,204,055 B2
(45) Date of Patent: Jan. 21, 2025

(54) LIDAR RECEIVER CIRCUIT HAVING REDUNDANCY TO BYPASS FAILURE

(71) Applicant: ELMOS SEMICONDUCTOR SE, Dortmund (DE)

(72) Inventors: André Srowig, Heidelberg (DE); Fabian Finkeldey, Bruchsal (DE)

(73) Assignee: ELMOS SEMICONDUCTOR SE, Dortmund (DE)

( * ) Notice: Subject to any disclaimer, the term of this patent is extended or adjusted under 35 U.S.C. 154(b) by 0 days.

(21) Appl. No.: 18/371,802

(22) Filed: Sep. 22, 2023

(65) Prior Publication Data

US 2024/0103146 A1    Mar. 28, 2024

(30) Foreign Application Priority Data

Sep. 27, 2022  (DE) ...................... 10 2022 124 775.9

(51) Int. Cl.
*G01S 7/497*  (2006.01)
*G01S 7/481*  (2006.01)
(Continued)

(52) U.S. Cl.
CPC ............ *G01S 7/497* (2013.01); *G01S 7/4816* (2013.01); *G01S 7/4863* (2013.01); *G01S 17/931* (2020.01)

(58) Field of Classification Search
CPC ...... G01S 7/497; G01S 7/4816; G01S 7/4863; G01S 17/931
See application file for complete search history.

(56) References Cited

U.S. PATENT DOCUMENTS

2009/0108177 A1*  4/2009  Chou ................... H04N 25/677
                                                438/4
2015/0285625 A1*  10/2015 Deane .................. G01S 7/4817
                                                348/140
(Continued)

FOREIGN PATENT DOCUMENTS

DE     10 2014 226 978 A1    7/2015
DE     10 2020 101 451 A1    8/2020

OTHER PUBLICATIONS

May 31, 2023 Examination Report in German Application No. 10 2022 124 775.9.

(Continued)

*Primary Examiner* — Jennifer D Bennett
(74) *Attorney, Agent, or Firm* — Oliff PLC

(57) ABSTRACT

A lidar receiver circuit for receiving optical signals using photodetectors to detect events or objects in the surrounding area, with a redundancy of receiver circuits for reducing failure probability, including a photodetector array for receiving optical signals and outputting a measurement signal, wherein the photodetectors are arranged as a two-dimensional matrix, a plurality of receiver circuits for receiving the measurement signal; a plurality of multiplexers, which are electrically arranged between the array and circuits and are connected thereto; wherein at least one of the multiplexers is connected to a column of photodetectors and at least two receiver circuits; each circuit is configured to receive and process the measurement signals of a column; a column of photodetectors is assigned to each receiver circuit by default; and the multiplexers connect a column to a receiver circuit other than the receiver circuit, which is assigned to the column of photodetectors by default.

22 Claims, 4 Drawing Sheets

(51) Int. Cl.
*G01S 7/4863* (2020.01)
*G01S 17/931* (2020.01)

(56) References Cited

U.S. PATENT DOCUMENTS

| | | | |
|---|---|---|---|
| 2020/0057150 A1* | 2/2020 | Beer | G01S 17/10 |
| 2022/0026543 A1* | 1/2022 | Bolatkale | H01L 31/107 |
| 2022/0217292 A1* | 7/2022 | Segovia De La Torre | H04N 25/673 |
| 2023/0375678 A1* | 11/2023 | Cadugan | G01S 17/32 |

OTHER PUBLICATIONS

Jul. 3, 2023 Decision to Grant in German Application No. 10 2022 124 775.9.

* cited by examiner

LIDAR RECEIVER CIRCUIT HAVING REDUNDANCY TO BYPASS FAILURE

The present invention relates to a lidar receiver circuit for receiving optical signals by means of photodetectors, in order to detect events or objects in the surrounding area of the lidar receiver circuit. The lidar receiver circuit has a redundancy of receiver circuits for reducing the failure probability. It comprises a photodetector array with a plurality of photodetectors for receiving optical signals and for outputting a measurement signal. The photodetectors are arranged as a two-dimensional matrix in the form of rows and columns.

Lidar receiver circuits and lidar sensors (lidar: light detection and ranging) are a type of optical sensors, which are used in many applications in order to detect the surrounding area of the sensor and to eventually evaluate it. For example, lidar sensors are used in vehicles, in order to detect the surrounding area of the vehicle and to perform a corresponding regulation of components of the vehicle. For example, lidar sensors can be used when a distance measurement to vehicles in front is to take place. Sensors of this type are also used in the case of an autonomous or partially autonomous driving of vehicles, during which an independent and automatic deceleration, steering, and acceleration of a vehicle is possible. The surrounding area directly in front of the vehicle but also in lateral regions around the vehicle has to be detected thereby. Methods for the direct time-of-flight measurement are often used thereby, in the case of which individual events are detected. A picture as to what the surrounding area of the vehicle looks like and whether objects are located in the vicinity of the vehicle can then be formed from the individual events by forming a histogram. An example of a time-of-flight light detection system is known from DE 10 2020 101 451 A1. DE 10 2014 226 978 A1 concerns a laser radar system for object detection and distance measurement.

Lidar receiver circuits and lidar sensors generally comprise a plurality of photodetectors or photodiodes, which are arranged in the form of a matrix. In the automobile field, arrays are typically used, which have more than 160×50 photodetectors or sensors. The lidar sensors additionally comprise a memory with a plurality of transistors. In the case of lidar sensors with approx. 260×80 pixels or photodetectors, respectively, the number is approx. 5.6 million transistors.

In spite of careful production under the best conditions and in a cleanroom, failure of individual transistors, which limit the functionality of the lidar sensors or which turn the entire sensor into waste, occurs during the production. During the implementation of the memory without redundancy, there is thus a high probability for yield losses, i.e. for the failure of individual transistors, which turn the sensor into waste.

In spite of the advancing development of lidar sensors, there is still a high demand for the improvement of these sensors, in particular with regard to a reduction of the failure probability during the production and with regard to the yield losses.

The stated object is solved by a lidar receiver circuit for receiving optical signals by means of photodetectors with the features of claim 1, by a lidar receiver system with the features of claim 14, and by a method with the features of claim 16.

It has been determined in the context of the invention that the increase of the redundancy is generally an effective means for reducing the yield losses. However, the redundancy of transistors or memory units leads to the problem that the extremely strongly parallelized structure then has differently long lines between the components and that time-of-flight differences are caused, which makes it impossible to use the circuits or which reduces the processing speed in such a way that a practical use is impossible.

In one aspect, the present invention relates to a lidar receiver circuit for receiving optical signals by means of photodetectors, in order to detect events and objects in the surrounding area of the lidar circuit. The lidar receiver circuit has a redundancy of receiver circuits for reducing the failure probability. It comprises a photodetector array with a plurality of photodetectors for receiving optical signals and for outputting a measurement signal. The photodetectors are arranged as a two-dimensional matrix in the form of rows and n columns, wherein the number of n is larger than 1, i.e. the matrix has at least two columns.

The lidar receiver circuit comprises a plurality of i receiver circuits for receiving the measurement signal of the photodetectors, wherein the number of i is larger than n. The circuit has a plurality of m multiplexers, which are electrically arranged between the photodetector array and the receiver circuits and which are connected to photodetectors and receiver circuits. The number m is thereby larger than 1; preferably m=n.

At least one of the multiplexers is connected to a column of photodetectors and to at least two receiver circuits. Each receiver circuit is configured to receive and to process the measurement signals of the photodetectors of a column. By default, a column of photodetectors is assigned to each receiver circuit. The multiplexers are configured to connect a column of photodetectors to a receiver circuit other than the receiver circuit, which is assigned in the column of photodetectors by default.

The multiplexers can thus assign a column of photodetectors to two different, preferably adjacent receiver circuits by means of corresponding interconnection, and can connect the column of photodetectors to one of the assigned receiver circuits. When a receiver circuit fails, which can be determined in the production by means of a measuring method and a measuring program, which runs by default, a multiplexer can thus be switched so that the column of photodetectors, which is by default provided for the defective receiver, is interconnected with an adjacent receiver circuit. Due to the matrix-shaped arrangement of the photodetectors and the parallelized arrangement of the receiver circuits, the line paths change only very little to not at all during the switch-over of a multiplexer from a receiver circuit to an adjacent receiver circuit. Thus, a change of the time-of-flight does not occur or is negligible in practice. Distortions thus do not occur during a time-of-flight measurement when a receiver unit fails and the multiplexer switches to another receiver circuit.

The paths to redundant receiver circuits, which can be SRAM blocks, for example, and the likewise redundant control blocks thereof comprising asynchronous time stamp latches can thus be kept as short as possible. The nominal connections between column of photodetectors to multiplexers and from multiplexers to the receiver circuits connected to the multiplexers can in particular be designed identically for all channels in a layout of a lidar receiver circuit. A change of the time-of-flight does not take place in this way even during the failure of another connection to an adjacent receiver circuit or during the switch-over in the multiplexer.

In a further aspect, the invention relates to a lidar receiver system comprising a lidar receiver circuit, as it is described here, and comprising a test circuit. The test circuit is configured to contact all receiver circuits and to perform a predetermined test, in order to detect a defect of a receiver circuit.

Based on the detection of a defect of the receiver circuit, the connected multiplexer can be controlled so that it activates the connection to the adjacent receiver circuit, which is likewise connected to the multiplexer, and guides signals from the column of photodetectors assigned to the multiplexer to the other receiver circuit, which is not defective.

In a further aspect, the invention relates to a lidar receiver circuit, as just described, which additionally comprises a light source for emitting optical radiation in the visible or non-visible range, which can be detected by the photodetectors. The lidar receiver system is configured in such a way that the emitted, optical radiation, which is reflected by an object in the surrounding area or vicinity of the lidar receiver system, is detected by at least one of the photodetectors of the photodetector array and is processed in at least one of the receiver circuits.

Further aspects of the invention relate to a corresponding method and a computer program product with program code for performing the steps of the method, when the program code is run on a computer, as well as a storage medium, on which a computer program is stored, which, when it is run on a computer, effects an execution of the method described herein.

According to a further aspect, the invention relates to a lidar receiver comprising the lidar receiver circuit, which is described herein and which is defined in the claims, or to a lidar system.

Another aspect of the invention relates to a vehicle comprising a lidar system or lidar receiver system comprising a lidar receiver circuit, as defined in the claims and described herein.

Preferred embodiments of the invention are described in the dependent claims. It goes without saying that the abovementioned features and the features, which will be described below, cannot only be used in the respective specified combination, but also in other combinations or alone, without leaving the scope of the present invention. The method and the computer program product can in particular be configured according to the embodiments, which are described for the device in the dependent claims.

In a preferred embodiment of the lidar receiver circuit, the receiver circuits are independent of one another. Each of the receiver circuits works on its own and is not influenced by adjacent circuits.

In a preferred embodiment, an asynchronous processing of the measurement signals takes place in the independent receiver circuits. The receiver circuits are thus not dependent on a common clock signal. Each receiver circuit then works as soon as a measurement signal is applied to the receiver circuit. A synchronization by means of a system clock is not necessary.

A preferred embodiment of the lidar receiver circuit provides that one of the multiplexers connects a column of photodetectors to a receiver circuit other than the receiver circuit, which is assigned by default, if a connection of the receiver circuit, which is assigned by default, to another column of photodetectors already exists. With the use of several multiplexers, which are connected to at least two, preferably three or four, preferably adjacent receiver circuits, it follows that a receiver circuit communicates with two or three, respectively, or four multiplexers, respectively. When a receiver circuit fails, an assignment takes place by the multiplexers in such a way that an active connection, by means of which measurement signals can be transmitted between the multiplexer and the receiver circuit, is replaced by a new, active connection. When a receiver circuit fails, it can thus be necessary that several multiplexers newly activate the already existing connections to a receiver circuit or have to switch over active connections, respectively, so that new connections are established. This can be necessary in order to ensure that only one column of photodetectors is assigned to each receiver circuit and that each receiver circuit only processes the measurement signals from one column of photodetectors. A 1:1 assignment of multiplexers to receiver circuits is also maintained when a receiver circuit fails.

A preferred embodiment of the lidar receiver circuit is configured in such a way that when detecting a defect of one of the receiver circuits, the corresponding multiplexer connects the corresponding column of photodetectors to another receiver circuit. The multiplexer is preferably connected to a receiver circuit, to which a connection to a column with photodetectors does not yet exist. Otherwise, a new assignment has to also take place for the newly selected receiver circuit by means of another multiplexer.

In a preferred embodiment of the receiver circuit, when detecting a (first) defect of the q-th receiver circuit, the corresponding q-th multiplexer will connect the q-th column of photodetectors to the receiver circuit, which is decreased by 1 (q−1-th receiver circuit). All first to q−1-th multiplexers change the assignment between the column of photodetectors and the receiver circuit according to the same principle. This process preferably takes place for all q smaller than or equal to m/2. q and m are natural numbers thereby; m is the number of the multiplexers.

This switch-over of the multiplexers thus preferably takes place for the first half of the multiplexers or receiver circuits, respectively, in a row of receiver circuits.

This interconnecting thus preferably takes place when a defect is detected in the first half of the receiver circuits.

In other words: When detecting a defect of a q-th receiver circuit, the corresponding q-th multiplexer connects the q-th column of photodetectors to the receiver circuit, which was decreased by 1, and all one to q−1-th multiplexers, which are preferably arranged in a fixed order, the r-th receiver circuit, which was decreased by 1, to the r+1-th column of photodetectors. The assignment between column and receiver circuit is changed or established according to the same principle. r is a natural number thereby. An assignment of the next-lower receiver circuit with the column of photodetectors, which is increased by 1, thus takes place.

If a further defect of a receiver circuit is detected, for example the defect of a q-th receiver circuit, the corresponding q-th multiplexer switches the q-th column of photodetectors with the receiver circuit (q+1), which was increased by 1, and connects it. The same takes place with all q+1-th to m-th multiplexers, which are preferably arranged in a fixed order, which connect the r-th receiver-circuit, which was increased by 1, to the r−1-th column of photodetectors. The assignment between column and receiver circuit takes place according to the same principle, and a connection is established so that this preferably applies for all q larger than or equal to m/2, wherein q and r as well as m are a natural number and m represents the total number of multiplexers.

The number i of the receiver circuits in the lidar receiver circuit is particularly preferably larger than the number m of the multiplexers. i is preferably larger than or equal to m+2, which means that the number of the receivers is larger by 2 or more than the number of the multiplexers. Particularly preferably, i is larger than or equal to m+3, the number of the receiver circuits is thus larger by at least 3 than the number of the multiplexers. A redundancy is thus at hand in such a way that two additional receiver circuits or three additional receiver circuits, respectively, are provided in the lidar receiver circuit, and two or three receiver circuits, respectively, can be defective, without the lidar receiver circuit having to be decommissioned.

In a preferred embodiment, the multiplexers used in the lidar receiver circuit or at least one of the multiplexers, respectively, are a 1:x multiplexer. A column of photodetectors can then be connected to x receiver circuits by means of the multiplexer. x−1 is thereby equal to the difference of the number i of receiver circuits to the number n of columns of photodetectors. Preferably, x=3, particularly preferably x=5.

In a preferred embodiment of the lidar receiver circuit, the number m of the multiplexers is equal to the number n in the column of the photodetectors. A multiplexer is thus assigned to each column of photodetectors.

A particular embodiment of the lidar receiver circuit provides that the receiver circuit is a TDC circuit, i.e. a time-to-digital conversion circuit.

The receiver circuit of the lidar receiver circuit preferably comprises a memory unit, which particularly preferably has a SRAM memory. Also preferably, the receiver circuit comprises a histogram memory, in order to form a histogram of optical events and to be able to draw a conclusion to objects in the vicinity of the lidar receiver circuit from the number of the occurring, optical events.

A preferred embodiment of the lidar receiver circuit provides that the photodetector comprises a photodiode, preferably an avalanche diode. In a highly preferred embodiment, a photodetector comprises a single photon avalanche diode (SPAD). The photodetectors additionally comprise a readout circuit.

According to a preferred embodiment of the lidar receiver circuit, it comprises a shift register, wherein the settings of the multiplexers are stored in the shift register. The default assignment of a column of photodetectors to a receiver circuit is preferably stored in the shift register, particularly preferably additionally or alternatively the current assignment of columns of photodetectors to receiver circuits.

The method according to the invention for bypassing a defective receiver circuit of a lidar receiver circuit, which is configured for receiving optical signals by means of photodetectors and for detecting objects in the surrounding area of the circuit, comprises the following steps: The production of a default assignment of n columns of photodetectors to the i−x receiver circuits of the m multiplexers takes place in a first step. What applies thereby is m=i−n. In other words, the number of the receiver circuits i is x times larger than the number of the columns of photodetectors. However, a column of photodetectors is only assigned to as many receiver circuits as there are columns of photodetectors by means of this step. The redundant receiver circuits do not experience an assignment. The redundant receiver circuits, just like all other receiver circuits, are nonetheless also connected to at least one multiplexer.

The detection of a defect of a q-th receiver circuit takes place in a further step.

In an assignment step, the current q-th column of photodetectors is assigned to another receiver circuit by means of the q-th multiplexer. The default assignment of column of photodetectors to receiver circuit is thus cancelled and a new assignment is performed by means of the corresponding (assigned) multiplexer. This takes place in the case of a defect of a first receiver circuit, wherein the first to q-th column of photodetectors is assigned to the respective previous, thus q−1-th receiver circuit here.

In a preferred embodiment of the method, the q-th to n-th column of photodetectors is assigned to the respective following (q+1-th) receiver circuit in the case of a further defect of another receiver circuit.

The invention will be described and explained in more detail below on the basis of some selected exemplary embodiments in connection with the enclosed drawings, in which.

Figure 1:
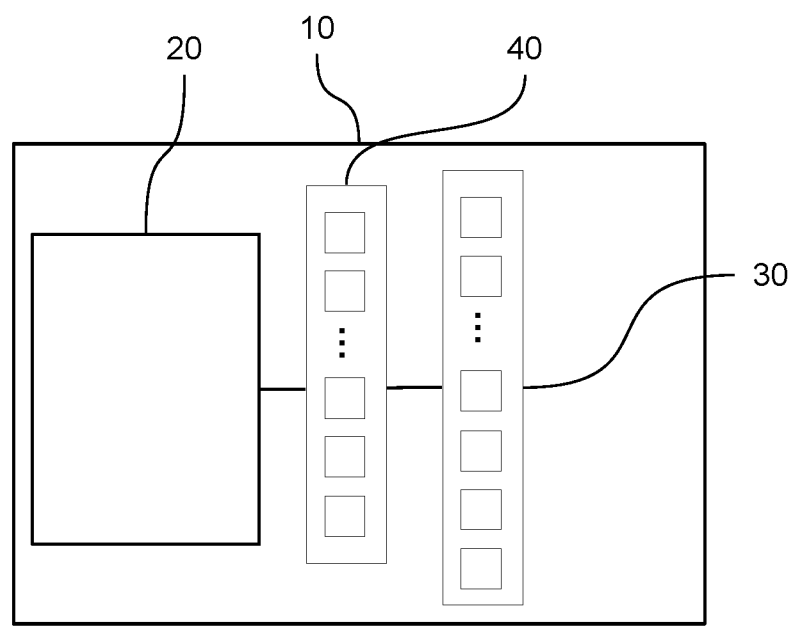
FIG. 1 shows a lidar receiver circuit according to the invention with a photodetector array.

The figures show a lidar receiver circuit 10 in different embodiments. The lidar receiver circuit 10 according to the invention according to FIG. 1 comprises a photodetector array 20 with a plurality of photodetectors 22, a plurality of receiver circuits 30 as well as a plurality of multiplexers 40, which are interconnected between photodetector array 20 and receiver circuits 30 and which in each case establish a connection between the photodetector array 20 and the receiver circuits 30.

Figure 2:
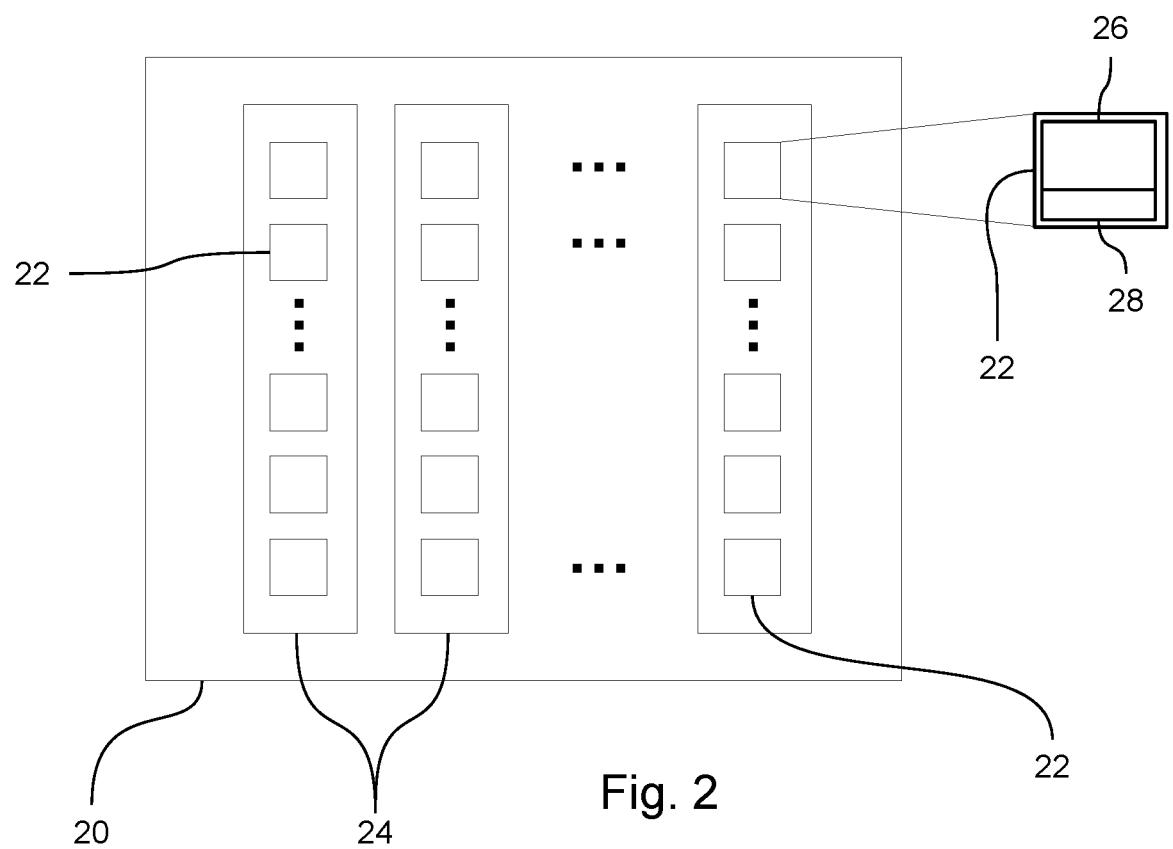
FIG. 2 shows the photodetector array from FIG. 1 in detail.

The photodetector array 20 is shown in detail in FIG. 2. It comprises a plurality of photodetectors 22 for receiving optical signals and for outputting a measurement signal. The photodetectors 22 are arranged as a two-dimensional matrix. They are thereby arranged in rows and n columns 24 in the photodetector array 20. At least two columns 24 of more than one photodetector 22 each are present. Preferred embodiments provide more than 100 columns 24 of photodetectors 22, preferably more than 150, more preferably more than 200, highly preferably more than 250. A preferred embodiment of a photodetector array 20 for a lidar circuit has, for example, 256 or 258 columns 24 of photodetectors. Each column 24 preferably comprises more than 10, highly preferably more than 50, particularly preferably 80 photodetectors 22. A photodetector array 20, which can receive and process a plurality of signals, can be constructed thereby.

According to a special embodiment, as shown in FIG. 2, a photodetector 22 can comprise, for example, a photodiode 26, which is preferably an avalanche diode and particularly preferably a single photon avalanche diode (SPAD). The photodetector 22 can furthermore comprise a readout circuit 28, in order to convert the light signal recorded by means of the photodiode 26 into an electric measurement signal. Other embodiments of photodetectors 22 are conceivable.

Figure 3:
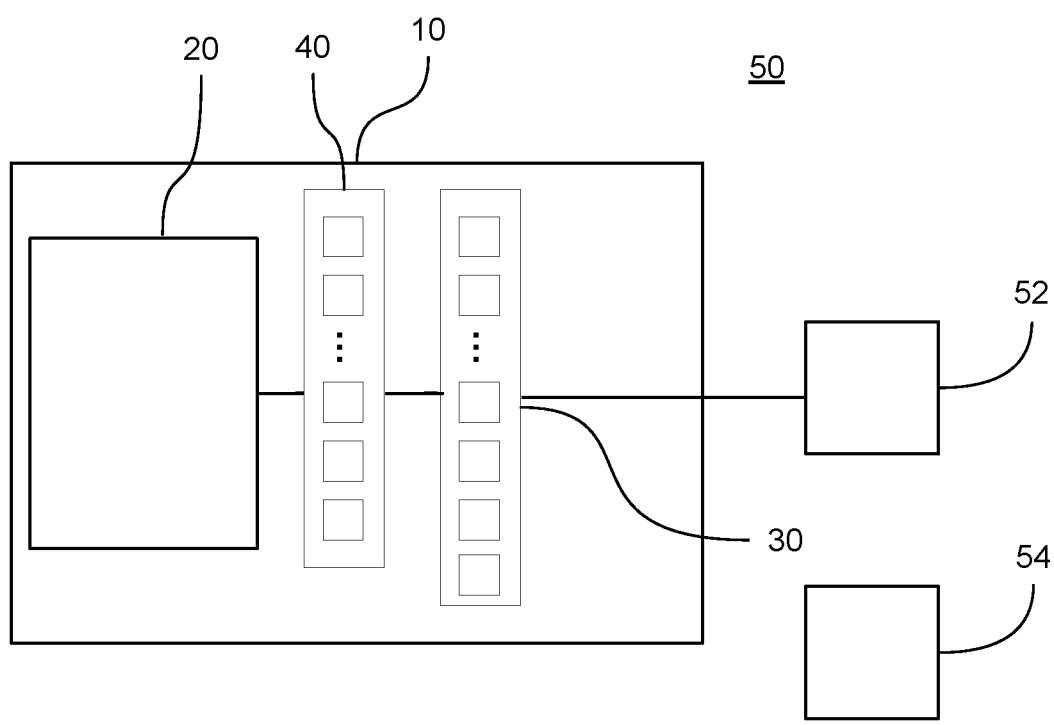
FIG. 3 shows a schematic diagram of a lidar receiver system with a lidar receiver circuit according to FIG. 1.

FIG. 3 shows a lidar receiver system comprising a lidar receiver circuit 10 as well as a test circuit 52, which is configured to contact the receiver circuits 30 of the lidar receiver circuit 10 and to perform a predetermined or specified test, in order to detect a defect of a receiver circuit 30.

A special embodiment of the lidar receiver system 50 is shown in FIG. 3, which furthermore comprises a light source 54, which preferably emits electromagnetic or optical signals or light signals in the visible or non-visible range. The light source 54 is preferably a laser light source or an infrared light source.

The preferably optical radiation of the light source 54 is emitted by the system and is reflected on an object in the vicinity or in the surrounding area of the lidar receiver system 50. The reflected radiation is received and detected by at least one of the photodetectors 22 of the lidar receiver circuit 10 and is processed in at least one of the receiver circuits 30.

The lidar receiver circuit 10 according to the invention is preferably constructed in such a way that it has a redundancy of receiver circuits 30 in order to reduce the failure probability of receiver circuits as a whole. The number of the receiver circuits 30 is thereby larger than the number of columns 24 of photodetectors 22 in the photodetector array 20 of the lidar receiver circuit 10. The number i of receiver circuits 30 is preferably larger by at least two, particularly preferably by at least four, than the number of columns 24 of photodetectors 22.

The number of the multiplexers m, which are electrically arranged between the photodetector array 20 and the receiver circuits 30, and which are connected to the columns 24 of the photodetector array 20 and the receiver circuits 30, is larger than 1. The number m of multiplexers 40 is preferably equal to the number n of columns 24 of photodetectors 22.

The lidar receiver circuit 10 is configured in such a manner that a multiplexer 40 is connected to at least two, preferably to at least three receiver circuits 30 and can in each case contact one of the receiver circuits 30. In this sense, "contact" means that an electrical connection is activated, so that an electrical signal is transmitted from a column 24 of photodetectors 22 to a receiver circuit 30.

Figure 4:
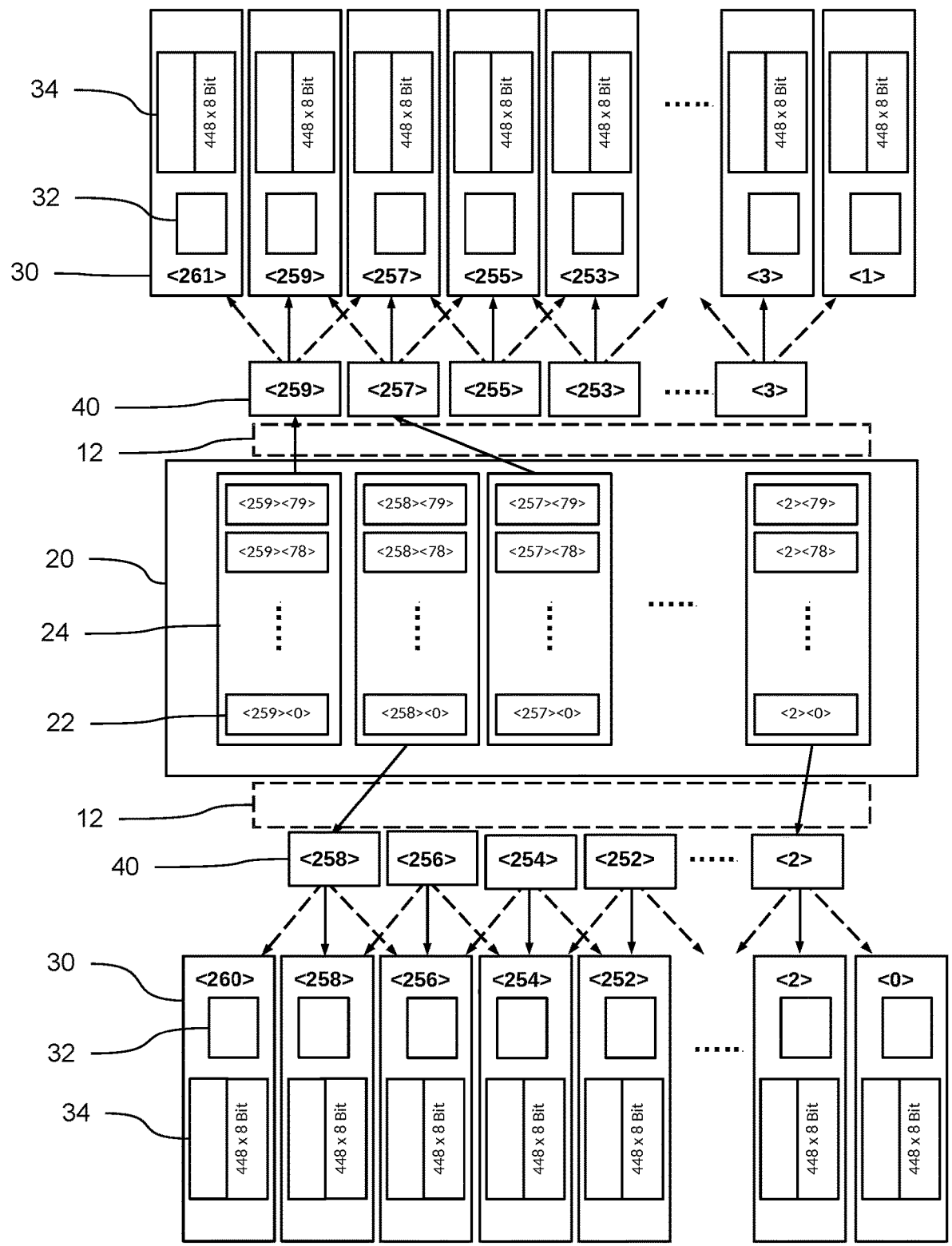
FIG. 4 shows a further embodiment of a lidar receiver circuit.

FIG. 4 shows an embodiment of a lidar receiver circuit 10, in the case of which the photodetector array 20 is arranged in the center of the circuit. The receiver circuits 30 and the multiplexers 40 are in each case arranged on the upper edge and on the lower edge. The total number of receiver circuits 30 and multiplexers 40 is halved thereby, so that one half of receiver circuits 30 and multiplexers 40 is arranged above the photodetector array 20, and the other half is arranged below the photodetector array 20.

The embodiment shown here shows a photodetector array 20 comprising a total of 258 columns 24, which each comprise 80 photodetectors 22.

The odd-numbered columns 24 are connected to multiplexers 40 above the array. The even-numbered columns 24 of the photodetector array 20 are connected to even-numbered multiplexers 40 below the array, as shown in FIG. 4.

In the embodiment shown here, a total of four more receiver circuits 30 than columns 24 are provided. In the group of the odd-numbered receiver circuits 30 and of the odd-numbered multiplexers 40, which are arranged above the photodetector array 20, there are thus two more receiver circuits 30 than multiplexers 40 are present. For example, the column 24 with the number 259 is connected to a multiplexer 40 with the number 259. The $259^{th}$ multiplexer 40, in turn, is connected to three receiver circuits 30, namely to those, which bear the numbers 257, 259, and 261. By default, the $259^{th}$ multiplexer is connected to the $259^{th}$ receiver circuit 30. This means that signals, in particular measurement signals, from the $259^{th}$ column 24 of photodetectors 22 are transferred to the 259 th multiplexer 40 and from there to the $259^{th}$ receiver circuit 30, as illustrated in FIG. 4 by means of the solid arrow. The $259^{th}$ multiplexer 40, however, can also optionally transfer the measurement signal received from the $259^{th}$ column 24 to the $257^{th}$ or the $261^{st}$ receiver circuit 30. This takes place, for example, when the $259^{th}$ receiver circuit 30 was detected to be defective in a test. A test performed by the test circuit 52 can thereby be used as basis.

This switching applies analogously for the even-numbered columns 24, multiplexers 40, and receiver circuits 30, which are arranged below the photodetector array 20.

In the case of a failure of the q-th receiver circuit 30, for example of the receiver circuit 30 with the number 259, the corresponding q-th ($259^{th}$) multiplexer 40 will connect the q-th column 24 of photodetectors 22 to a receiver circuit other than the q-th receiver circuit 30, namely to the q−1-th or the q+1-th receiver circuit 30.

The q-th multiplexer 40 is preferably interconnected with the q−1-th receiver circuit 30, when the defect takes place at a receiver circuit 30, which is arranged in the first half of the respective groups of receiver circuits 30. In the case of the odd-numbered receiver circuit 30, the defect of the receiver circuit would then also be within the $3^{rd}$ to $129^{th}$ receiver circuit 30. If a receiver circuit 30 is detected in the second half of the group of receiver circuits 30, i.e. in the half of the receiver circuits 30 with the higher, odd numbers, a q-th multiplexer 40 will then connect the q-th column 24 to the q+1-th receiver circuit 30.

It goes without saying that it is possible to also always select the receiver circuit 30 with the next-smaller number or always with the next-larger number. For example, this can also be made dependent on whether or not a defective receiver circuit 30 has already been detected in the first half of receiver circuits 30. If no receiver circuit 30 is detected to be defective, a multiplexer 40 can initially also control the next-larger receiver circuit 30 in the upper half of receiver circuits 30.

When deviating from the default assignment of multiplexers 40 to receiver circuits 30 when detecting a defective receiver circuit 30, the assignments of all other multiplexers 40 to corresponding receiver circuits 30 need to optionally also be changed accordingly.

If, for example, the receiver circuit 30 with the number 3 is detected to be defective, the assignment between the multiplexer 40 with the number 3 to the receiver circuit 30 with number 3 is cancelled. On the contrary, a connection is established between the multiplexer 40 with the number 3 to the receiver circuit 30 with number 1. All other assignments between multiplexers 40 and receiver circuits 30 then remain unaffected. In the case of a defect of the penultimate receiver circuit 30, for example with the number 259, all other assignments between multiplexers 40 and receiver circuits 30 also remain unaffected. However, if, for example, the receiver circuit 30 with the number 257 is detected to be defective, the multiplexer 257 establishes a connection to the receiver circuit 30 with the number 259. The multiplexer 40 with the number 259 must then establish an assignment to the receiver circuit 30 with the number 261, accordingly.

Due to the changed assignments, lidar receiver circuits 10 comprising one or two defective receiver circuits 30 can thus also be used and delivered. The number of tolerable, defective receiver circuits 30 depends on the number of the redundancy; in other words, it depends on how many more receiver circuits 30 there are than multiplexers 40.

In a preferred embodiment as shown in FIG. 4, the lidar receiver circuit 10 comprises a shift register 12, which is illustrated in a dashed manner here. The assignments between multiplexers 40 and receiver circuits 30 are stored in the shift register 12. The default assignments are initially stored thereby. In the event of a detection of a defect, however, the changed and new assignments are stored. An overwriting of the values in the shift register can thus take place.

It can be seen in FIG. 4 that the receiver circuits 30 preferably comprise a time-to-digital conversion circuit, TDC circuit 32. The receiver circuit 30 preferably furthermore comprises a memory unit 34, which is preferably a SRAM memory. Additionally or alternatively, the receiver circuit 30 can also comprise a histogram memory, in order to form a histogram, i.e. to collect, for example add up, optical signals, which are detected by means of the photodetectors 22.

The embodiment shown in FIG. 4 has the advantage that in spite of redundancy of receiver circuits 30, the line lengths remain virtually the same even in the case of a non-standard interconnection of multiplexers 40 and receiver circuits 30. Possibly occurring time-of-flight differences are thus negligible in the practical system. Due to the massively parallelized structure, a distortion of time-of-flight measurements thus does not take place. This is a requirement, which is made, for example, by control blocks comprising asynchronous time stamps, in the case of which the lines to the redundant SRAM blocks (receiver circuit) have to be kept as short as possible. In spite of redundant formation of the lidar receiver circuit 10, the nominal connections, i.e. the default connections between photodetector 22 and receiver circuit 30 are designed identically for all channels in the layout. Additional receiver circuits 30 on the outer edges of the row of receiver circuits 30 are provided as redundant receiver circuits 30. The number of the redundant blocks can be designed arbitrarily.

Due to the arrangement with two groups of receiver circuits 30 and multiplexers 40, for example above and below the photodetector array 20, as shown in FIG. 4, two subsystems can be provided, which each have two redundant receiver circuits 30. In the subsystem of the even-numbered receiver circuits, these are the receiver circuits with the numbers 0 and 260, in the subsystem or the group of the odd-numbered receiver circuits 30, respectively, these are the circuits with the numbers 1 and 261. In the case of two redundant receiver circuits 30, that is, two additional receiver circuits 30, which are unused in the normal case, per group or subsystem, 3:1 multiplexers 40 are then provided between the columns 24 and photodetectors 22 and the receiver circuits 30. The multiplexer 40 can thus contact the directly assigned receiver circuit 30 or the right and left adjacent circuits, respectively, and can establish connections to them.

With this arrangement, as shown, for example, in FIG. 4, up to two defective receiver circuits per subsystem can be masked out in each of the two group systems or subsystems, respectively, in that the multiplexers 40 are configured accordingly, so that, between two defective blocks (receiver circuits), the nominal receiver circuits 30 (SRAM blocks) are assigned to the photodetector columns. Left of the left block, all left neighbors of the nominal receiver circuit are assigned to the photodetector columns. Right of the right defective receiver circuit (block), all right neighbors of the nominal receiver circuit are assigned to the photodetector columns. In this way, in the case of defects, not the defective blocks or receiver circuits 30, respectively, are replaced by explicitly redundant ones, which would result in significantly different distances and assignments to the columns 24 of photodetectors. Instead, a plurality of functional and functioning receiver circuits 30 (SRAM blocks) are shifted in their assignment.

It is ensured thereby that the difference in the distance of the connections or lines between a column 24 of photodetectors 22 and the receiver circuit 30, in particular of the memory unit 34, is negligible, and the distances are not larger than the other distances to other receiver circuits 30. This is important in particular when using time stamps. The multiplexing prior to the synchronous SRAM control of the memory unit 34 has the large advantage that the interface consists only of two signals per column 24 of photodetectors 22 here, namely the asynchronous trigger input and the reset of the respective column 24 at the end of each SRAM access, in order to actively end the dead time and in order to be sensitive for the next optical signal in the photodetector 22 or in the corresponding column 24, respectively. SRAM control of the receiver circuit and reset of the photodetectors 22 of the respective column 24 are created jointly in a circuit.

The yield losses during the production with the architecture described here and shown in a special embodiment in FIG. 4 are massively improved. In the case of an arrangement according to FIG. 4 and two redundant receiver circuits 30 in the two groups of receiver circuits 30 (above and below the photodetector array 20), leads to a significant increase of the reliability of the system.

If the probability of an individual error in the complete lidar receiver circuit 10 is p, this is the failure probability for the complete circuit. The production yield without redundancy then results in v=1−p.

The failure probability in one half of the receiver circuits 30 without redundancy is p/2. The failure probability in one half of the receiver circuits 30 with twice the redundancy is $(p/2)^3$. A failure occurs only in the case of three errors. In this case, the failure probability for a complete lidar receiver circuit 10 is with 2×2-times the redundancy, thus is equal to $p_r=2\times(p/2)^3$.

This results in a production yield with redundancy of $v_r=1-p_r=1-2\times(p/2)^3$.

When assuming a failure probability of 50%, a production yield of 50% thus results without redundancy, but a production yield of 97% results with redundancy.

A failure probability equal to 10% without redundancy leads to a production yield of equal to 90%, and with redundancy to a production yield of equal to 99.975%.

The redundancy remains effective even for significantly inferior error probabilities:

Without redundancy, a failure probability of p equal to 75% leads to a production yield of equal to 25%, with redundancy to a production yield of equal to 89.5%.

Should the error probability be in fact this high, a larger redundancy would solve this problem, e.g. four redundant receiver circuits 30 per half of receiver circuits 30 (i.e. per group (subsystem) of receiver circuits 30). In this case, the failure probability is calculated to be $p_r=2\times(p/2)^5$; only the fifth error leads to the failure of the entire lidar receiver circuit 10.

In the case of an error probability of 75%, a production yield of 25% then results without redundancy, and a production yield of 98.5% with 2×4-times the redundancy.

The redundancy is thus an effective means for significantly reducing yield losses. By means of the arrangement and embodiment proposed here, the connecting paths to the redundant receiver circuits 30 can be nearly of the same length even in the case of failed receiver circuits 30. This means that the connecting paths between the photodetectors 22 and the receiver circuits 30 are of identical lengths for all connections, such that they have no effects whatsoever and are negligible in practice.

Figure 5:
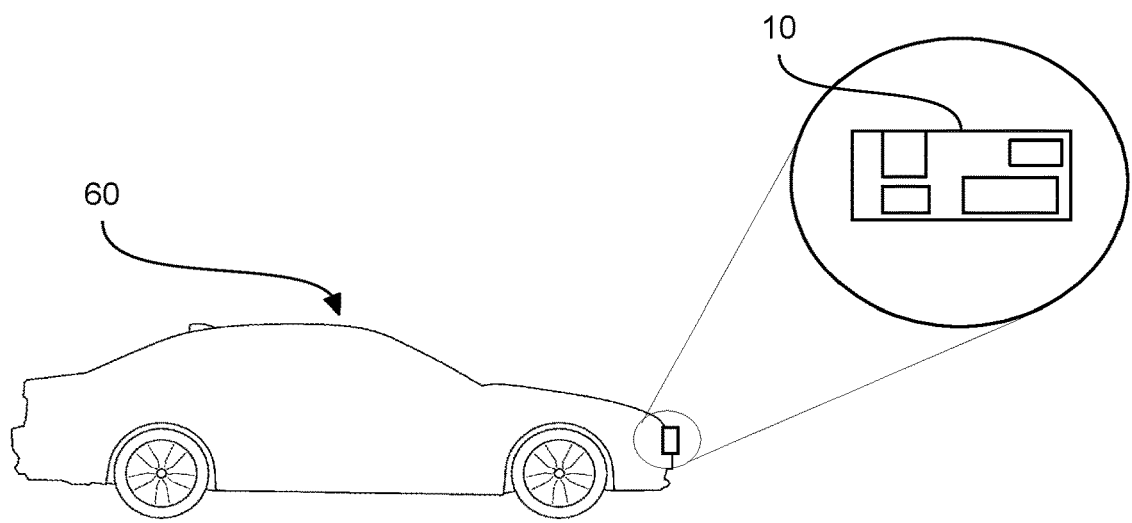
FIG. 5 shows a schematic diagram of a vehicle with a lidar receiver circuit according to the invention.

FIG. 5 shows a vehicle 60 comprising a lidar system, which comprises the lidar receiver circuit 10 according to FIG. 1 or according to FIG. 4.

Figure 6:
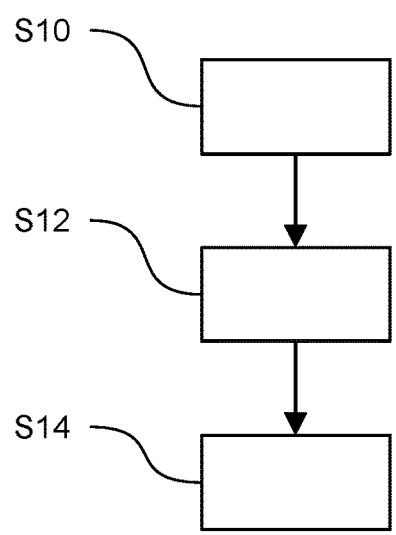
FIG. 6 shows a general flowchart of a method for bypassing a defective receiver circuit of a lidar receiver circuit according to FIG. 1

FIG. 6 schematically shows a process sequence for reducing yield losses during the production of a lidar receiver circuit 10 for receiving optical signals by means of the photodetectors 22, in order to detect events or objects in the surrounding area of the lidar receiver circuit 10. The lidar receiver circuit 10 is preferably formed according to one of the embodiments according to FIGS. 1 to 4. The method ensures that in the event a redundancy of receiver circuits 30 is present, even in the case of a failure of a specified, acceptable number of receiver circuits 30, a lidar receiver circuit 10 can be produced which works properly and which, despite redundancy, excludes falsification in time-of-flight measurements, in particular in the case of time-critical, asynchronous time stamps or time signals.

In a first step S10 of producing a default assignment, n columns 24 of photodetectors 22 are assigned to the i-x receiver circuits 30 by means of the m multiplexers 40. What applies thereby is that i−n=x, whereby i is the number of all receiver circuits 30, x is the number of the redundant receiver circuits 30, and n is the number of the columns 24 of photodetectors 22.

In a further step S12 of detecting a defect, defects are detected in a receiver circuit, for example in a q-th receiver circuit 30. A step S14 of assigning the current q-th column 24 of photodetectors 22 to another receiver circuit 30 by means of the q-th multiplexer 40 follows. When detecting a defect, the default assignment between columns 24 of photodetectors 22 and receiver circuits 30 is thus cancelled, so that the q-th column 24 is assigned by means of the q-th multiplexer 40 to a receiver circuit other than the q-th receiver circuit 30, thus to a w-th receiver circuit 30, whereby it applies that q is not equal to w. Preferably, w=q±1.

According to the method, the first to q-th column 24 of photodetectors 22 is assigned to the respective previous receiver circuit 30, thus to the q−1-th receiver circuit 30, in the case of a defect of a first receiver circuit 30. In the case of a first defect, an assignment to the adjacent receiver circuits 30, i.e. to the previous receiver circuit 30 thus takes place because the first receiver circuit 30 is a redundant receiver circuit 30 and, by default, is not assigned to a column 24 of photodetectors 22.

When detecting a second defect of a receiver circuit 30, i.e. a second defective receiver circuit 30, the q-th to n-th column 24 of photodetectors 22 can preferably be assigned to the respective following, i.e. to the q+1-th receiver circuit 30. An assignment of the q-th column 24 thus takes place to the next-higher receiver circuit 30. This is readily possible because the last, i.e. the i-th receiver circuit 30, is a redundant circuit, and, by default, is not assigned to any column 24 of photodetectors 22.

The invention was described and explained comprehensively on the basis of the drawings and the description. The description and explanation are to be understood as an example, and not as a limitation. The invention is not limited to the disclosed embodiments. Other embodiments or variations follow for the person of skill in the art when using the present invention as well as during an exact analysis of the drawings, of the disclosure, and of the following patent claims.

In the patent claims, the words "comprising" and "with" do not exclude the presence of further elements or steps. The indefinite article "a" does not rule out the presence of a plurality. The mere mention of some measures in several different dependent patent claims is not to be understood such that a combination of these measures cannot likewise be used in an advantageous manner. Reference numerals in the patent claims are not to be understood as a limitation.

The invention claimed is:

1. A lidar receiver circuit for receiving optical signals by means of photodetectors, in order to detect events or objects in a surrounding area of the lidar receiver circuit, with a redundancy of receiver circuits for reducing a failure probability, comprising:
    a photodetector array with a plurality of photodetectors, each of which comprises a single photon avalanche diode (SPAD), for receiving optical signals and for outputting a measurement signal, wherein the photodetectors are arranged as a two-dimensional matrix in a form of rows and n columns, with a number n being larger than 1;
    a plurality of i receiver circuits, each of which comprises a time-to-digital conversion circuit, for receiving the measurement signal of the photodetectors, with a number i being larger than n; and
    a plurality of m multiplexers, which are electrically arranged between the photodetector array and the receiver circuits, with a number m being larger than 1,
    wherein:
    at least one of the m multiplexers is connected to a column of photodetectors and to at least two receiver circuits among the i receiver circuits;
    each receiver circuit of the plurality of i receiver circuits is configured to receive and to process the measurement signal of the photodetectors of one column;
    n receiver circuits of the plurality of i receiver circuits are assigned to one of the n columns of photodetectors by default;
    the multiplexers are configured to connect a respective column of photodetectors to a receiver circuit of the plurality of i receiver circuits other than a default receiver circuit which is assigned to the respective column by default;
    the receiver circuits are arranged in at least one row;
    a first receiver circuit and a last receiver circuit of the at least one row of receiver circuits are configured to be free of a default connection to any multiplexer of the plurality of m multiplexers, and
    when a receiver circuit fails, the multiplexers are switched in such a way that the column of photodetectors intended for the failed receiver circuit and all subsequent or preceding ones are switched to neighboring subsequent or preceding receiver circuits, respectively.

2. The lidar receiver circuit according to claim 1, wherein the plurality of i receiver circuits are independent of one another.

3. The lidar receiver circuit according to claim 1, wherein an asynchronous processing of the measurement signals takes place in the receiver circuits.

4. The lidar receiver circuit according to claim 1, wherein one of the m multiplexers connects the respective column of photodetectors to the receiver circuit other than the default receiver circuit if a connection of the default receiver circuit to another column of photodetectors already exists.

5. The lidar receiver circuit according to claim 1, wherein when detecting a defect of one of the receiver circuits, a corresponding multiplexer connects a column of photodetectors corresponding to said multiplexer, to another receiver circuit, to which a connection to a column of photodetectors does not yet exist.

6. The lidar receiver circuit according to claim 5, wherein when detecting a defect of a q-th receiver circuit of the plurality of i receiver circuits, a corresponding q-th multiplexer connects a q-th column of the n columns of photodetectors to a q–1-th receiver circuit, which was decreased by one, where q is a natural number and is smaller than or equal to m/2, and all of first to q–1-th multiplexers change or establish assignment between a column of photodetectros and a receiver circuit according to a same principle.

7. The lidar receiver circuit according to claim 5, wherein when detecting a defect of a q-th receiver circuit of the plurality of i receiver circuits, a corresponding q-th multiplexer connects a q-th column of the n columns of photodetectors to a q+1-th receiver circuit, which was increased by one, where q is a natural number and is larger than or equal to m/2, and all of q+1-th to m-th multiplexers change or establish assignment between a column of photodetectros and a receiver circuit according to a same principle.

8. The lidar receiver circuit according to claim 1, wherein the number i of receiver circuits is larger than the number m of multiplexers.

9. The lidar receiver circuit according to claim 1, wherein the number i of receiver circuits is larger than or equal to m+2, wherein m is the number of multiplexers.

10. The lidar receiver circuit according to claim 1, wherein each multiplexer of the m multiplexers is a 1-to-x multiplexer that can connect one column of photodetectors to x number of receiver circuits among the i receiver circuits, wherein x–1 is equal to a difference between the number i and the number n.

11. The lidar receiver circuit according to claim 1, wherein each multiplexer of the m multiplexers is a 1-to-x multiplexer that can connect one column of photodetectors to x number of receiver circuits among the i receiver circuits, wherein x is equal to 3 or 5.

12. The lidar receiver circuit according to claim 1, wherein the number m of multiplexers is equal to the number n of columns of the photodetectors.

13. The lidar receiver circuit according to claim 1, wherein the receiver circuit comprises a memory unit or a SRAM memory or a histogram memory.

14. The lidar receiver circuit according to claim 1, wherein the photodetectors comprise a readout circuit.

15. The lidar receiver circuit according to claim 1, comprising a shift register, wherein the settings of the multiplexers are stored in the shift register.

16. The lidar receiver circuit according to claim 1, comprising a shift register, wherein the default assignment or the current assignment of a column of photodetectors to a receiver circuit is stored in the shift register.

17. A lidar receiver system comprising the lidar receiver circuit according to claim 1 and a test circuit, wherein the test circuit is configured to address all receiver circuits and to perform a predetermined test, in order to detect a defect of a receiver circuit.

18. The lidar receiver system according to claim 17, comprising a light source for emitting optical radiation in the visible or non-visible range, which can be detected by the photodetectors, wherein the radiation, which is reflected by an object in the surrounding area or vicinity of the lidar receiver system, is detected by at least one of the photodetectors of the photodetector array and is processed in at least one of the receiver circuits.

19. A method for bypassing a defective receiver circuit of the lidar receiver circuit according to claim 1, for receiving optical signals by means of photodetectors, in order to detect events or objects in the surrounding area of the lidar receiver circuit, comprising the following steps:
establishing a default assignment of the n columns of photodetectors to i-x receiver circuits among the plurality of i receiver circuits using the m multiplexers, wherein i–n=x applies;
detecting a defect of a q-th receiver circuit among the plurality of i receiver circuits; and
assigning a corresponding q-th column of the n columns of photodetectors to another receiver circuit by means of a corresponding q-th multiplexer,
wherein, in the case of a defect of a first receiver circuit, the first to q-th column of the n columns of photodetectors is assigned to a respective previous receiver circuit.

20. The method according to claim 19, wherein in the case of a defect of a second receiver circuit, the q-th to n-th column of photodetectors is assigned to a respective following receiver circuit.

21. The lidar receiver circuit according to claim 1, wherein
receiver circuits having a default connection to a corresponding multiplexer are continually arranged in the at least one row without a receiver circuit, which is free of a default connection, being inserted in-between.

22. The lidar receiver circuit according to claim 1, wherein:
control blocks of the receiver circuits comprise asynchronous time stamp latches, and the receiver circuits are not dependent on a common clock signal, and
a SRAM control of each receiver circuit and a reset of photodetectors in a corresponding column are created jointly in a circuit.

* * * * *